(12) United States Patent
Arvan

(10) Patent No.: US 8,118,013 B2
(45) Date of Patent: Feb. 21, 2012

(54) RESONATOR AND CRANKCASE VENTILATION SYSTEM FOR INTERNAL COMBUSTION ENGINE

(75) Inventor: Gary J. Arvan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 713 days.

(21) Appl. No.: 12/236,554

(22) Filed: Sep. 24, 2008

(65) Prior Publication Data

US 2010/0071676 A1    Mar. 25, 2010

(51) Int. Cl.
*F02B 25/06* (2006.01)
(52) U.S. Cl. ... 123/572; 123/573; 123/574; 123/184.57; 123/184.47
(58) Field of Classification Search ............ 123/572
See application file for complete search history.

(56) References Cited

U.S. PATENT DOCUMENTS

| | | | | |
|---|---|---|---|---|
| 3,990,415 A * | 11/1976 | Malphettes | ............ | 123/184.57 |
| 6,006,712 A * | 12/1999 | Suzuki | ............ | 123/184.57 |
| 6,619,276 B1 * | 9/2003 | Miller et al. | ............ | 123/572 |
| 6,810,861 B2 * | 11/2004 | Itakura et al. | ............ | 123/516 |
| 7,513,246 B2 * | 4/2009 | Hazelton et al. | ............ | 123/572 |
| 7,950,363 B2 * | 5/2011 | Currie et al. | ............ | 123/184.57 |
| 2003/0136386 A1 | 7/2003 | Itakura et al. | | |
| 2009/0314241 A1 * | 12/2009 | Koss et al. | ............ | 123/184.53 |

FOREIGN PATENT DOCUMENTS

JP    2006144686 A    6/2006

* cited by examiner

*Primary Examiner* — Michael Cuff
*Assistant Examiner* — James Kim
(74) *Attorney, Agent, or Firm* — Quinn Law Group, PLLC

(57) ABSTRACT

The present invention provides a crankcase ventilation system and resonator for a turbocharged internal combustion engine assembly. The resonator, designed for intake noise reduction, is mounted to the engine. An oil separation unit, designed for passage of blowby gases, is mounted to a cam cover, sandwiched between the resonator and cam cover. The resonator has a resonator body defining a resonator volume therein. The resonator fluidly communicates the oil separation unit with the turbocharger air inlet pipe, whereby blowby gases are evacuated from the cam cover and delivered through the resonator volume for reintroduction to the engine's air intake system. Integration of the blowby passages into the resonator reduces the number of potential leak paths in the air induction system, and reduces overall engine mass, cost, and packaging size. The present design also offers improved Onboard Diagnostics (OBD) by allowing only large flow areas to be disconnected.

19 Claims, 2 Drawing Sheets

RESONATOR AND CRANKCASE VENTILATION SYSTEM FOR INTERNAL COMBUSTION ENGINE

TECHNICAL FIELD

The present invention relates generally to internal combustion engines, and more specifically to internal combustion engine assemblies equipped with a resonator and a crankcase ventilation system with oil separation unit.

BACKGROUND OF THE INVENTION

"V-type" internal combustion engine (ICE) assemblies are traditionally defined by an engine block having a pair of outwardly angled cylinder banks with inside walls that define an interbank valley therebetween. Each cylinder bank of a typical V-type, over-head valve internal combustion engine assembly defines one or more cylinder bores each having a piston reciprocally movable therein. The piston and cylinder bore cooperate with a portion of a cylinder head, which is generally attached to the top face of the cylinder bank, to form a variable volume combustion chamber.

The cylinder head defines intake ports through which air, provided by an intake manifold, is selectively introduced into the combustion chamber. Additionally, the cylinder head defines exhaust ports through which exhaust gases or products of combustion are selectively evacuated from the combustion chamber. Normally, an exhaust manifold is affixed to the cylinder head, by bolting or other fastening means, such that the exhaust manifold communicates with each exhaust port to carry the exhaust gases from the ICE to a vehicular exhaust aftertreatment system, which may include a catalytic converter and muffler, for subsequent treatment and release into the atmosphere. In some cases, the exhaust manifold may also be integrated into the cylinder head.

Many modern day ICE assemblies employ a mechanical supercharging device, such as a turbocharger (short for turbine driven, forced induction supercharger), to compress the airflow before it enters the intake manifold in order to increase engine power and efficiency. Specifically, a turbocharger is a gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

Noise is often generated during the introduction of air into the air intake system by an acoustic phenomena known as "intake pulsing". Various methods may be employed to attenuate the intake noise of an internal combustion engine. A resonator, for example, may be attached to the air induction system, typically using clamps and hoses, upstream from the intake manifold (e.g., to the air cleaner or intake body). Resonator devices of various configurations are available in the prior art which are specifically designed to counteract, attenuate, and/or absorb intake air sound energy. Induction tuning of the intake manifold not only reduces unwanted noise, but maximizes air flow by minimizing or counteracting the effects of standing waves and other acoustic phenomena generated in the air induction system.

During normal operation of internal combustion engines, including diesel and gasoline engines, some gas in the combustion chamber will begin to leak into the crankcase. Gas escapes through gaps between the piston and the cylinder during the compression and combustion strokes. This gas, commonly referred to in the art as "blowby", contains trace amounts of lubrication oil, unburned fuel, and water vapor. Excessive blowby gas may result in reduced cylinder compression, as well as oil contamination and dilution.

Alternate methods have been proposed to minimize the occurrence and effects of the blowby phenomena. Crankcase Ventilation systems are designed to evacuate blowby gases from the crankcase, and prevent the blowby gases from being expelled into the atmosphere. Such ventilation systems recirculate the blowby gases back into the intake manifold, to re-enter the combustion chamber as part of a fresh charge of air and fuel. An oil separator is often incorporated into the blowby gas ventilation system to separate oil from the blowby gas, and thereby reduce the amount of oil which is ventilated to the intake path of the ICE and burnt in the combustion chamber.

SUMMARY OF THE INVENTION

According to one embodiment of the present invention, an internal combustion engine (ICE) assembly may be provided. The ICE assembly includes an engine block having a crankcase portion that is adjacent to a cylinder case portion. The cylinder case portion defines one or more cylinder bores therein. An air intake system is in fluid communication with the cylinder bore(s), and configured to selectively deliver air charges thereto. A valve cover, which may consist of a cam cover or rocker cover, is operatively attached to the engine block. The valve cover is in fluid communication with the crankcase portion of the engine block to receive blowby gases therefrom. The ICE assembly also includes a sound dissipating resonator that has a resonator body which defines a resonator volume therein. The resonator body, which may be positively attached to the engine block, fluidly communicates the valve cover with the engine air intake system, whereby blowby gases are delivered or evacuated from the valve cover through the resonator volume to the air intake system. Integration of the blowby passage into the resonator reduces the number of potential leak paths in the air induction system, and reduces overall engine mass, cost, and packaging size.

In one aspect of this embodiment, the ICE assembly also includes an oil separation unit that fluidly communicates the valve cover with the resonator. The oil separation unit is configured to separate entrained oil particulates from the blowby gases that are evacuated therethrough from the engine crankcase. Ideally, the oil separation unit is positively attached to the valve cover, sandwiched between the valve cover and resonator.

According to another aspect, the resonator body defines a fluid inlet port having a first diameter, and a fluid outlet port having a second diameter. In this regard, a first connection neck is in fluid communication between the inlet port and the valve cover. The first connection neck has a third diameter that is greater than the first diameter of the resonator inlet port. In addition, a second connection neck is in fluid communication between the outlet port and air intake system. The second connection neck has a fourth diameter that is greater than the second diameter of the resonator outlet port. First and second annular seal members respectively fluidly seal the connections between the first and second connection necks and the fluid inlet and outlet ports. By providing enlarged flow areas at the resonator inlet port—i.e., the connection between the oil separation unit and resonator body, and at the resonator outlet port—i.e., the connection between the resonator body and the turbocharger air inlet pipe, the present design offers improved On-board Diagnostics (OBD) by allowing only large flow areas to be disconnected for which leakage is easier to diagnose due to the increased leak rate.

In accordance with another aspect of this embodiment, the internal combustion engine assembly also includes a blowby breather pipe that is disposed within the resonator body. The blowby breather pipe is in fluid communication with both the fluid inlet and outlet ports of the resonator body, and configured for delivering the blowby gases through the resonator volume. In addition, a first blowby vent is located inside the first connection neck, fluidly communicating the valve cover to the blowby breather pipe. A second blowby vent is located inside the second connection neck, fluidly communicating the engine's air intake system with the blowby breather pipe. In this instance, third and fourth annular seal members respectively fluidly seal the connections between the blowby breather pipe and the first and second blowby vents.

According to yet another aspect, a supercharging device is placed in fluid communication with the air intake system, and configured to provide compressed airflow thereto. The supercharging device includes an air inlet hose that is in fluid communication with the resonator body to receive blowby gases therefrom for subsequent delivery to the engine air induction system. The supercharging device includes a compressor blade that is rotatably disposed inside of a compressor housing, and configured for compressing airflow. A turbine blade is rotatably disposed inside of a turbine housing. The turbine blade is attached to the compressor blade for unitary rotation therewith. The turbine housing is configured to redirect exhaust flow from the ICE to spin the turbine blade and, thus, the compressor blade.

According to another embodiment of the present invention, an internal combustion engine assembly may be provided. The ICE assembly includes an engine block with a crankcase portion configured to at least partially house a crankshaft therein. The engine block also includes a cylinder case portion that is proximate to the crankcase portion. The cylinder case portion defines a plurality of cylinder bores, each of which has a piston reciprocally movable therein. An air intake system is in fluid communication with each of the cylinder bores, and configured to selectively deliver air-charges thereto.

A valve cover is attached to the engine block (e.g., bolted to a cylinder head), and in fluid communication with the crankcase portion to receive and exhaust blowby gases therefrom. An oil separation unit is positively attached to, and in fluid communication with the valve cover. The oil separation unit is configured to separate entrained oil particulates from blowby gases that are evacuated therethrough from the valve cover. A sound dissipating resonator, which is positively attached to the engine block, has a resonator body that defines a resonator volume therein. The resonator body is in fluid communication between the oil separation unit and air intake system and thereby fluidly communicates the same. In so doing, the resonator operates to evacuate the blowby gases from the oil separation unit, and deliver them to the air intake system through the resonator volume.

In accordance with yet another embodiment of the present invention, an internal combustion engine assembly may be presented. The ICE assembly in this particular embodiment includes an engine block with a crankcase portion at least partially housing a crankshaft therein. The ICE assembly also has a cylinder case portion with first and second cylinder banks, each of which defines at least one cylinder bore therein. Each cylinder bore has a piston reciprocally movable therein and operatively connected to the crankshaft. The first and second cylinder banks are oriented with respect to one another such that they form an angle of less than 180 degrees, and define a generally V-shaped interbank valley therebetween. An air intake system is in fluid communication with each of cylinder bores, and configured to selectively deliver air-charges thereto.

A cam cover is operatively attached to the engine block, and configured to at least partially house a camshaft therein. The cam cover is in fluid communication with the crankcase portion of the engine block to receive and exhaust blowby gases therefrom. An oil separation unit is positively attached to, and in fluid communication with the cam cover. The oil separation unit is configured to separate entrained oil particulates from blowby gases evacuated therethrough from the cam cover. A sound dissipating resonator is positively attached to the engine block, and has a resonator body that defines a resonator volume therein. The resonator body is in fluid communication between the oil separation unit and the air intake system. The resonator body fluidly communicates the oil separation unit with the air intake system, whereby blowby gases are evacuated from the oil separation unit and delivered to the air intake system through the resonator volume. Finally, a turbocharger device is located within the V-shaped interbank valley, between the first and second cylinder banks. The turbocharger device is in fluid communication with the air intake system, and configured to provide compressed airflow thereto. The turbocharger device has an air inlet hose that is in fluid communication with the resonator body to receive blowby gases therefrom for reintroduction to the air intake system.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
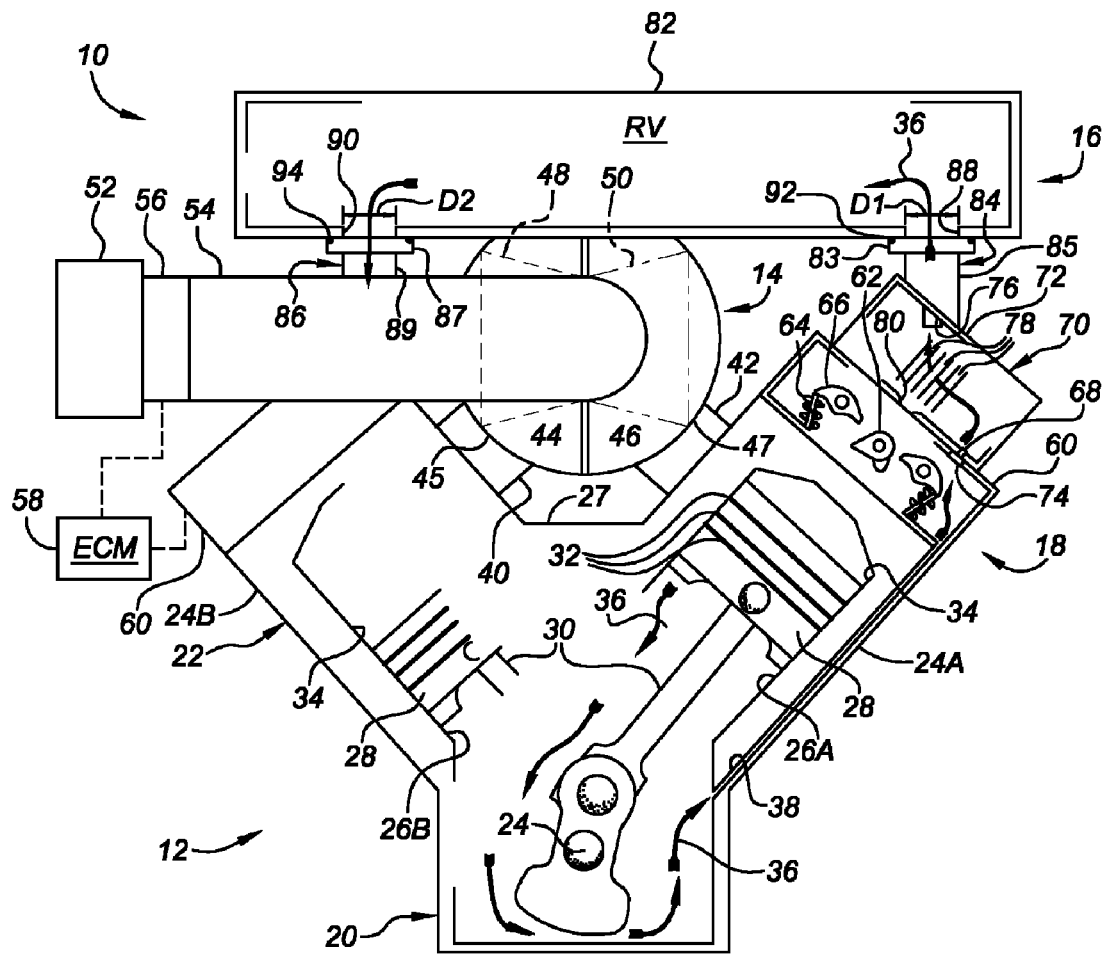
FIG. 1 is a partially-broken away, schematic illustration of an exemplary internal combustion engine assembly equipped with a resonator and Crankcase Ventilation system in accordance with the present invention.

Referring to the drawings, wherein like reference numbers refer to like components throughout the several views, there is shown a schematic illustration of a representative internal combustion engine (ICE) assembly with which the present invention may be incorporated and practiced. It should be readily understood that the ICE assembly illustrated herein is merely provided as an exemplary application by which the present invention may be utilized. As such, the present invention is by no means limited to the particular engine configuration shown in the drawings. In addition, the ICE assembly illustrated herein has been greatly simplified, it being understood that further information regarding the standard operation of an internal combustion engine, whether it be spark ignited or compression ignited, may be found in the prior art. Finally, the drawings presented herein are not to scale and are provided purely for instructional purposes. Thus, the individual and relative dimensions shown in the drawings are not to be considered limiting.

Referring now to FIG. 1, the ICE assembly, generally indicated as 10, is illustrated as a turbocharged, V-type 8-cylinder engine. Recognizably, the ICE assembly 10 may take on additional configurations, including, but not limited to, "Inline" engine assemblies having more or fewer than eight cylinders. In addition, the ICE assembly lo may operate in a compression ignited (e.g., 2-stroke diesel engine) or spark ignited (e.g., 4-stroke gasoline engine) combustion mode within the scope of the invention claimed herein. Moreover, the present invention may be applied to other motorized vehicles, such as, but not limited to, standard passenger cars, sport utility vehicles, minivans, buses, construction vehicles, tractors, boats, etc., without departing from the intended scope of the present invention.

The ICE assembly 10 includes an engine block and cylinder head, represented collectively at 12, and is equipped with a supercharging device, represented herein by a turbocharger device 14, a sound damping resonator device 16, and a crankcase ventilation system 18 (which may also be referred to herein as "breather unit" or "blowby system"). Those skilled in the art will recognize that the engine block and cylinder head 12 may be integrally formed (as depicted in FIG. 1), or be pre-fabricated as individual components that are subsequently connected, e.g., by bolting or other fastening method. The engine block 12 may be broken down into two separate portions: a crankcase portion, indicated generally at 20, and a cylinder case portion, indicated generally at 22. The crankcase portion 20 at least partially houses a crankshaft 24, which is rotatably mounted therein in any known manner. The crankshaft 24 is readily adapted to transmit the ICE's available power output, typically at a number of revolutions per minute (RPM), to a final drive system (not shown herein).

The engine block 12, as noted above, has a generally "V-type" configuration. In a V-type configuration, the engine's cylinder case portion 22 includes a left and a right bank of cylinder bores, referred to hereinafter as first and second cylinder banks 24A and 24B, respectively, outwardly oriented with respect to one another at an included angle of less than 180 degrees to define a V-shaped interbank valley 27 therebetween. Each of the first and second cylinder banks 24A, 24B defines one or more piston cylinder bores, represented collectively in FIG. 1 as first and second cylinder bores 26A and 26B, respectively.

With continuing reference to FIG. 1, each cylinder bore 26A, 26B has a piston 28 reciprocally movable therein and operatively connected to the crankshaft 24—i.e., via connecting rods 30. The engine pistons 28 each have an array of annular piston rings 32 that fit into longitudinally spaced grooves or "ring lands" that extend continuously about the outer diameter thereof. Although the number and orientation of the piston rings 32 may be varied, the piston 28 is shown with three piston seal rings 32: the top two intended primarily for compression sealing (referred to in the art as "compression rings"); the lower ring intended for controlling the distribution of lubricating oil (referred to in the art as "oil control ring").

With continued reference to FIG. 1, the ICE assembly 10 includes an exhaust manifold (or exhaust header), which is represented schematically at 40. The exhaust manifold 40 is designed to receive and expel exhaust gases and other products of combustion from the various combustion chambers 34 through a plurality of exhaust ports (not shown). The ICE assembly 10 also includes an air intake system, including an inlet manifold and throttle body, which is represented schematically at 42. The air intake system 42 operates to regulate the amount of air flowing into the engine 10, normally in response to driver input, current operating conditions, etc.

The supercharging device—i.e., turbocharger 14, is in fluid communication with the ICE assembly 10, and operates to provide compressed air to the engine's air intake system 42. More specifically, the turbocharger device 14 includes a turbine portion 44 and a compressor portion 46, both of which are nested in the engine interbank valley 27, between the first and second cylinder banks 24A, 24B. The turbine portion 44 has a turbine housing 45 that is in fluid communication with the exhaust manifold 40 by an intake duct or hose. The turbine housing 45 redirects the flowing exhaust stream to spin a turbine blade or impeller, shown hidden in FIG. 1 at 48, which is rotatably mounted therein. The compressor portion 46 has a compressor housing 47 with a compressor blade, shown in phantom in FIG. 1 at 50, which is rotatably mounted therein. The turbine blade 50 is rigidly attached to the compressor blade 48 for unitary rotation therewith.

Ambient air is received by the turbocharger 14 through a clean air filter 52 that is fluidly coupled to the compressor housing 47 via air inlet hose 54. As the compressor blade 48 spins (i.e., through the driving engagement with the turbine blade 50), air received from air filter 52 is condensed within the compressor housing 47. Air compressed by the compressor portion 46 is then communicated by an output duct or hose to the ICE air induction system 42 for introduction to the individual chambers 34. Those skilled in the art will recognize that the present invention may incorporate a single turbocharger (as illustrated herein), twin turbochargers, staged turbochargers, or various other engine supercharging devices, or may omit the supercharging device completely, without departing from the intended scope and spirit of the present invention.

Still referring to FIG. 1 of the drawings, a mass airflow (MAF) sensor 56 is positioned between the clean air filter 52 and turbocharger air inlet hose 54. The MAF sensor 56, which may be in the nature of a vane meter MAF sensor, hot- or cold-wire MAF sensor, or other conventional type, is used to monitor the mass of air entering the ICE assembly 10—i.e., passing through the compressor portion 46 of turbocharger device 14. An engine control module 58, which is schematically depicted in FIG. 1 in a representative embodiment as a microprocessor-based electronic control unit of conventional architecture, is in operative communication with the MAF sensor 56 and engine block 12. The MAF sensor 56 converts the amount of air drawn into the ICE assembly 10 into a voltage signal, and communicates this information to the ECM 58. The air mass information is necessary for the ECM 58 to monitor and control fueling, exhaust gas recirculation (EGR), and other engine parameters effecting combustion. The MAF sensor 56 is also required for monitoring OBD parameters. As such, the ECM 58 continuously monitors engine air intake, utilizing the MAF sensor 56, through what is known as "Onboard Diagnostics" or "OBD compliance". Those skilled in the art will recognize and understand that the means of communication utilized by the ECM 58 is not restricted to the use of electric cables ("by wire"), but may be, for example, by radio frequency and other wireless technology, fiber optic cabling, etc.

During normal operation of the ICE assembly 10, small amounts of combustion gases may leak from the combustion chambers 34, past the piston rings 32, and through the oil circulating within the crankcase portion 20 to create a pressurized mixture of air, exhaust gases and atomized oil—i.e., blowby gases (depicted in FIG. 1 as arrows 36 for explanatory purposes). The crankcase ventilation system 18, which may be an open- or closed-type arrangement, is used to meter blowby gases from the engine crankcase portion 20 into the engine's intake manifold, where they are consumed during normal engine operation.

A cam cover or rocker cover 60 (referred to collectively hereinafter as a "valve cover"), is attached, in a preferably fluid tight manner, to the engine block 12—e.g., via bolts (not shown). The valve cover 60 is shown in FIG. 1 partially broken away to illustrate certain exemplary components housed therein. Specifically, the valve cover 60 is designed to cover and protect a valve train, which is represented herein by a cam shaft 62, a plurality of intake and exhaust poppet valves 64, and a corresponding number of rocker arm assemblies 66. It should be recognized, however, that the valve train may take on other configurations, including, but not limited to, overhead valve (OHV), dual-overhead cam (DOHC), electrohydraulic camless valve trains (EHCV), etc., within the scope of the present invention.

The valve cover 60 is in fluid communication with the crankcase portion 20 of the engine block 12 to receive blowby gases therefrom. According to the embodiment of FIG. 1, for example, the engine block 10 defines one or more elongated blowby channels 38 (only one of which is visible in the drawings), which extends between the crankcase portion 20 and valve cover 60, up one or both cylinder banks 24A, 24B. Exploiting the vacuum (or pressure gradient) created by the air intake system 42 (i.e., the intake manifold), blowby gases 36 are drawn up the blowby channel 38 and into the valve cover 60. The crankcase ventilation system 18 may utilize a one-way flow control valve 68 (referred to hereinafter as "PCV"), that fluidly connects the valve cover 60 to an oil separation unit 70. The PCV 68 may also be located at 85 or 86. The PCV 68 controls the level of pressure or vacuum in the engine crankcase 20. The crankcase ventilation system 18 may also contain an oil return valve 74.

The oil separation unit 70 is configured to separate entrained oil particulates from the blowby gases 36 that are evacuated therethrough from the engine crankcase portion 20. By way of example, and not limitation, the oil separation unit 70 of FIG. 1 includes a housing assembly 72, which includes both a gas inlet 74 and a gas outlet 76 for drawing blowby gases, and discharging the filtered gas, respectively. A medium for separating entrained oil from the blowby gases 36, represented herein in a purely exemplary embodiment by baffles 78, are housed within the oil separation unit housing assembly 72. Oil separated from the blowby gas through operation of baffles 78 is returned to the crankcase and cylinder case portions 20, 22 of the ICE assembly 10 through a return orifice 80.

The oil separation unit 70 is positively attached to the valve cover 60, sandwiched between the valve cover 60 and the sound damping, noise dissipating resonator device 16, fluidly coupling the same. The resonator 16 is preferably of the "Helmholtz Resonator" type, which utilizes the Helmholtz resonance phenomena to counteract or attenuate unwanted air intake noise. To be more particular, the resonator 16 consists of a known volume, or "resonator volume" RV, that is enclosed by a rigid container or resonator body 82, illustrated in FIG. 1 as a rectangular hexahedron (but may be of any shape). The resonator body 82 is fluidly coupled to the ICE air induction system 42 by a neck 86 of predetermined length and diameter which is fluidly connected to the turbocharger air inlet hose 54. An external variation in air pressure causes a mass of air in the neck 86 to oscillate in and out, producing adiabatic compressions and rarefactions of the enclosed air, which acts to dissipate intake sound energy.

The resonator body 82 is mounted to the cylinder case portion 22 of the engine block 12, positioned vertically adjacent to the turbocharger 14. In accordance with the present invention, the resonator body 82 fluidly communicates the valve cover 60 and oil separation unit 70 with the engine air intake system 42. It is through this fluid interconnection that blowby gases 36 are delivered or evacuated from the valve cover 60, passing within the oil separation unit 70, through the resonator volume RV to the turbocharger air inlet hose 54 for subsequent delivery to the air intake system 42. Integration of the blowby passage into the resonator 16 as described above reduces the number of potential leak paths in the engine's air induction system, and reduces overall engine mass, cost, and packaging size by eliminating additional air ducts normally required for prior art resonator and PCV systems. It should be noted that the resonator 16 may take on alternative configurations, such as, but not limited to, expansion chamber resonators, wave tube resonators, etc., so long as the blowby passage from the valve cover 60 through the resonator volume RV to the air intake system 42 is maintained.

Figure 1A:
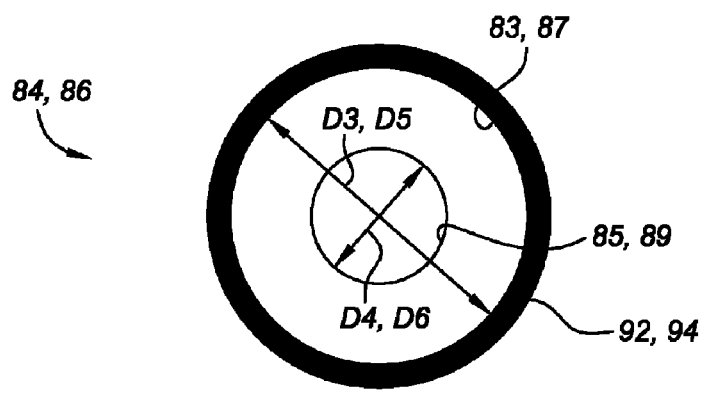
FIG. 1A is schematic plan-view illustration of the connection neck fluidly communicating the oil separation unit and resonator of FIG. 1.

The resonator body 82 defines a fluid inlet port 88 having a first diameter D1, and a fluid outlet port 90 having a second diameter D2. A first connection neck 84 extends between and fluidly communicates the oil separation unit 70 to the resonator inlet port 88. The first connection neck 84 is comprised of two interconnected cylindrical portions: a first interface portion 83 that is attached to the resonator body 82 and has a third diameter D3; and a second interface portion 85 that is attached to the oil separation unit 70 and has a fourth diameter D4. As can be seen in FIGS. 1 and 1A, the diameter D3 (and thus the cross-sectional area) of the first interface portion 83 is greater than the diameter D1 of the resonator inlet port 88 and the diameter D4 of the second interface portion 85. In addition, a second connection neck 86, as discussed above, extends between and fluidly communicates the outlet port 90 of the resonator body 82 and the air inlet hose 54 of the turbocharger 14. The second connection neck 86 is also comprised of two interconnected cylindrical portions: a third interface portion 87 that is attached to the resonator body 82 and has a fifth diameter D5; and a fourth interface portion 89 that is attached to the turbocharger air inlet hose 54 and has a sixth diameter D6. As can be seen in FIGS. 1 and 1A, the diameter D5 (and thus the cross-sectional area) of the third interface portion 87 is greater than the diameter D2 of the resonator outlet port 90 and the diameter D6 of the fourth interface portion 89. First and second annular seal members 92 and 94, respectively, fluidly seal the connections between the first and second connection necks 84, 86 and the fluid inlet and outlet ports 88, 90. Although illustrated in FIGS. 1 and 1A as geometrically identical, the individual geometries and dimensions of the first and second connection necks 84, 86 may be varied.

OBD of the ICE air intake system 42 is achieved, in part, by detecting fluid disconnects in the crankcase ventilation system 18 through continuous monitoring of changes in the MAF 56 reading. By providing enlarged flow areas at the resonator inlet port 88—i.e., the connection between the oil separation unit 70 and resonator body 82, and at the resonator outlet port 90—i.e., the connection between the turbocharger air inlet pipe 54 and the resonator body 82, the present design offers improved Onboard Diagnostics (OBD). Improved OBD is achieved because, if the first and connection necks 84, 86 are inadvertently disconnected, by providing only large flow areas, the leakage is easier to diagnose due to the increased leak rate.

Figure 2:
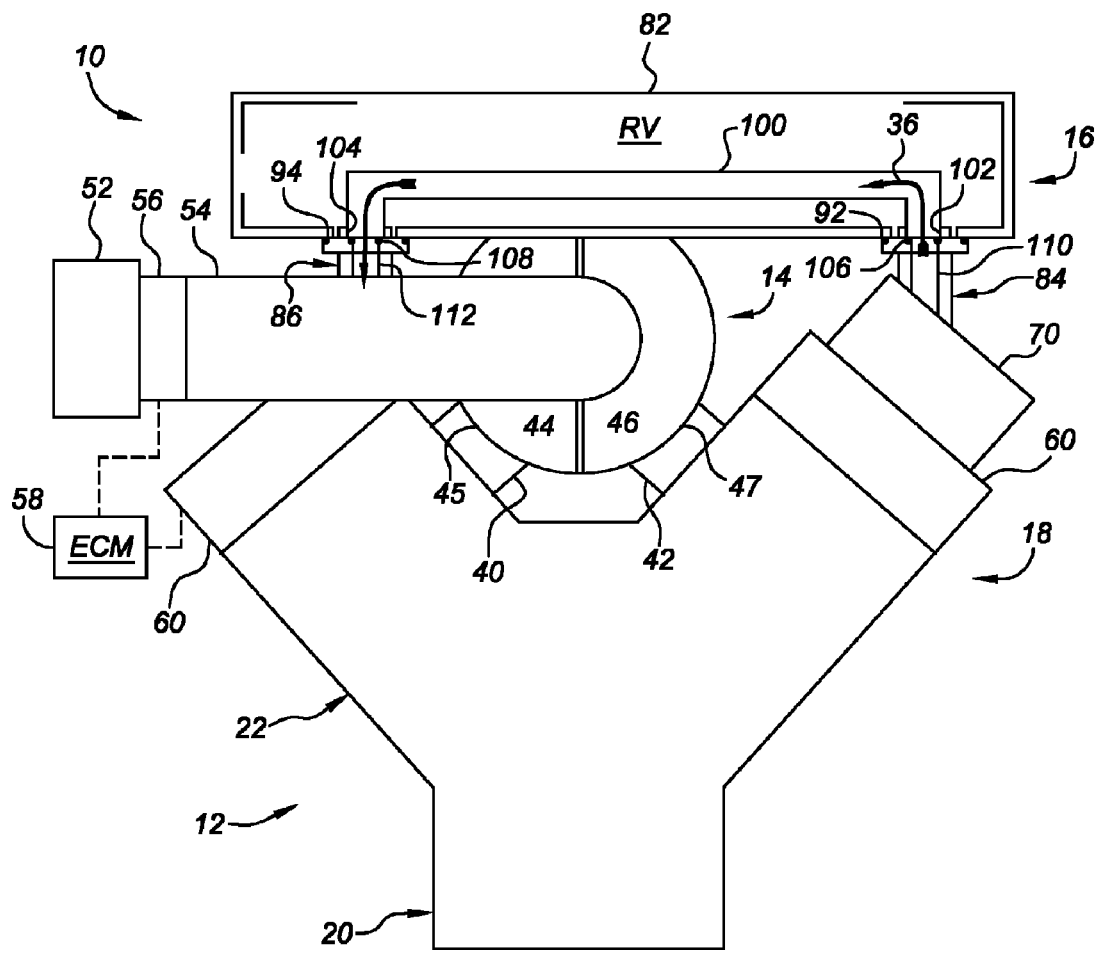
FIG. 2 is a partially-broken away, schematic illustration of an internal combustion engine assembly equipped with a resonator and Crankcase Ventilation system in accordance with another embodiment the present invention.
Figure 2A:
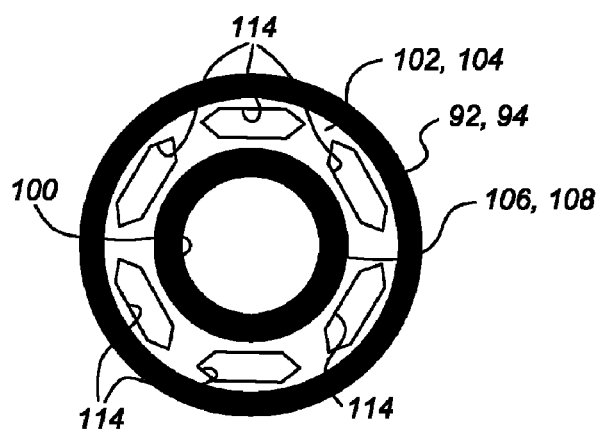
FIG. 2A is schematic plan-view illustration of the connection neck fluidly communicating the oil separation unit and resonator of FIG. 2.

Referring now to FIGS. 2 and 2A, wherein like reference numbers refer to like components from FIGS. 1 and 1A, the internal combustion engine assembly 10 may include an optional blowby breather pipe 100 that is disposed within the resonator body 82. The blowby breather pipe 100 of FIG. 2 extends between and fluidly communicates the resonator fluid inlet port 102 and fluid outlet port 104. The blowby breather pipe 100 is configured for delivering the blowby gases 36 from the oil separation unit 70, through the resonator body 82, to the turbocharger air inlet hose 54, isolating the blowby gas 36 from the resonator volume RV. In addition, a first blowby vent 110 is preferably at least partially located inside the first connection neck 84, and fluidly communicating the valve cover 40 through the oil separation unit 70 to the breather pipe 100. A second blowby vent 112 is located inside the second connection neck 86, fluidly communicating the blowby breather pipe 100 to the engine's air intake system 42 through the turbocharger air inlet hose 54. In this instance, third and fourth annular seal members 106 and 108, respectively, fluidly seal the connections between the blowby breather pipe 100 and the first and second blowby vents 110, 112. As seen in FIGS. 2 and 2A, the inlet and outlet ports 102, 104 of the resonator 16 are defined by a plurality of apertures 114 designed to provide a flow path into the resonator 82 if the breather pipe 100 disconnects from the first and second blowby vents 110, 112.

While the best modes for carrying out the present invention have been described in detail, those familiar with the art to which this invention relates will recognize various alternative designs and embodiments for practicing the invention within the scope of the appended claims.

The invention claimed is:

1. An internal combustion engine assembly, comprising:
   an engine blocking having a crankcase portion adjacent a cylinder case portion, the cylinder case portion defining at least one cylinder bore therein;
   an air intake system in fluid communication with the at least one cylinder bore and configured to selectively deliver air-charges thereto;
   a valve cover operatively attached to the engine block, and in fluid communication with the crankcase portion to receive blowby gases therefrom; and
   A sound dissipating resonator having a resonator body defining a resonator volume therein, wherein the resonator body is in fluid communication with the valve cover and with the air intake system, whereby blowby gases are delivered from the valve cover to a blowby breather pipe disposed within the resonator body and configured to deliver blow by gases to the air intake system.

2. The internal combustion engine assembly of claim 1, further comprising:
   an oil separation unit fluidly communicating the valve cover with the resonator, and configured to separate entrained oil particulates from blowby gases evacuated therethrough from the crankcase portion.

3. The internal combustion engine assembly of claim 2, wherein the oil separation unit is positively attached to the valve cover between the valve cover and the resonator.

4. The internal combustion engine assembly of claim 1, wherein the resonator body defines a fluid inlet port having a first diameter and a fluid outlet port having a second diameter.

5. The internal combustion engine assembly of claim 4, further comprising:
   a first connection neck in fluid communication between the inlet port and the valve cover, and having a third diameter that is greater than the first diameter; and
   a second connection neck in fluid communication between the outlet port and the air intake system, and having a fourth diameter that is greater than the second diameter.

6. The internal combustion engine assembly of claim 5, wherein a first and a second seal member respectively fluidly seal the connections between the first and second connection necks and the fluid inlet and outlet ports.

7. The internal combustion engine assembly of claim 5, wherein:
   The blowby breather pipe and is in fluid communication with both the fluid inlet and outlet ports.

8. The internal combustion engine assembly of claim 7, further comprising:
   a first blowby vent at least partially located inside the first connection neck and fluidly communicating the valve cover with the blowby breather pipe; and
   a second blowby vent at least partially located inside the second connection neck and fluidly communicating the air intake system with the blowby breather pipe.

9. The internal combustion engine assembly of claim 7, wherein a third and a fourth seal member respectively fluidly seal the connections between the blowby breather pipe and the first and second blowby vents.

10. The internal combustion engine assembly of claim 1, further comprising:
    a supercharging device in fluid communication with the air intake system and configured to provide compressed airflow thereto, the supercharging device having an air inlet hose in fluid communication with the resonator body to receive blowby gases therefrom.

11. The internal combustion engine assembly of claim 10, wherein the supercharging device includes a compressor blade rotatably disposed in a compressor housing and configured for compressing airflow, and a turbine blade rotatably disposed in a turbine housing, the turbine blade being attached to the compressor blade for unitary rotation therewith, the turbine housing being configured to redirect exhaust flow from the internal combustion engine to spin the turbine blade.

12. The internal combustion engine assembly of claim 1, wherein the resonator is positively attached to the engine block.

13. An internal combustion engine assembly, comprising:
    an engine block having a crankcase portion configured to at least partially house a crankshaft, and a cylinder case portion proximate to the crankcase portion and defining a plurality of cylinder bores therein, each of the plurality of cylinder bores having a piston reciprocally movable therein;
    an air intake system in fluid communication with each of the plurality of cylinder bores and configured to selectively deliver air-charges thereto;
    a valve cover operatively attached to the engine block, and in fluid communication with the crankcase portion to receive blowby gases therefrom;
    an oil separation unit positively attached to and in fluid communication with the valve cover, and configured to separate entrained oil particulates from blowby gases evacuated therethrough from the valve cover;
    a sound dissipating resonator positively attached to the engine block and having a resonator body defining a resonator volume therein, the resonator body in fluid communication with the oil separation unit and with the air intake system, whereby blowby gases are evacuated from the oil separation unit and delivered to the air intake system through the resonator volume; and a blowby breather pipe disposed within the resonator body and configured to deliver the blowby gases through the resonator volume.

14. The internal combustion engine assembly of claim 13, further comprising:

a supercharging device in fluid communication with the air intake system and configured to provide compressed airflow thereto, the supercharging device having an air inlet hose in fluid communication with the resonator body to receive blowby gases therefrom for reintroduction to the air intake system.

15. The internal combustion engine assembly of claim 14, wherein the resonator body defines a fluid inlet port having a first diameter and a fluid outlet port having a second diameter.

16. The internal combustion engine assembly of claim 15, further comprising:

a first connection neck operatively attached to and fluidly communicating the inlet port of the resonator with the oil separation unit, the first connection neck having a third diameter that is greater than the first diameter; and a second connection neck operatively attached to and fluidly communicating the outlet port of the resonator with the air inlet hose of the supercharging device, the second connection neck having a fourth diameter that is greater than the second diameter.

17. The internal combustion engine assembly of claim 16, wherein the blowby breather pipe is in fluid communication with both the fluid inlet and outlet ports.

18. An internal combustion engine assembly, comprising:

an engine block having a crankcase portion at least partially housing a crankshaft therein, and a cylinder case portion having first and second cylinder banks each of which defines at least one cylinder bore therein, each of the at least one cylinder bores having a piston reciprocally movable therein and operatively connected to the crankshaft, wherein the first and second cylinder banks are oriented with respect to one another such that they form an angle of less than 180 degrees and define a generally V-shaped interbank valley therebetween;

an air intake system in fluid communication with each of the at least one cylinder bores and configured to selectively deliver air-charges thereto;

a cam cover operatively attached to the engine block and configured to at least partially house a camshaft therein, wherein the cam cover is in fluid communication with the crankcase portion to receive blowby gases therefrom;

an oil separation unit positively attached to and in fluid communication with the cam cover, and configured to separate entrained oil particulates from blowby gases evacuated therethrough from the cam cover;

a sound dissipating resonator positively attached to the engine block and having a resonator body defining a resonator volume therein, the resonator body in fluid communication with the oil separation unit and with the air intake system, whereby blowby gases are evacuated from the oil separation unit and delivered to the air intake system through the resonator volume;

a blowby breather pipe disposed within the resonator body and configured to deliver the blowby gases through the resonator volume;

a turbocharger device at least partially located within the V-shaped interbank valley, the turbocharger device being in fluid communication with the air intake system and configured to provide compressed airflow thereto, wherein the turbocharger device has an air inlet hose in fluid communication with the resonator body to receive blowby gases therefrom for reintroduction to the air intake system;

wherein the resonator body defines a fluid inlet port having a first diameter and a fluid outlet port having a second diameter, the blowby breather pipe being in fluid communication with the fluid inlet port and the fluid outlet port; and a plurality of apertures defined by the fluid inlet port and the fluid outlet port and radially outwards of the blowby breather pipe, the plurality of apertures being configured to provide an alternate flow path into the resonator.

19. The internal combustion engine assembly of claim 4, further comprising:

a plurality of apertures defined by the fluid inlet port and the fluid outlet port and radially outwards of the blowby breather pipe, the plurality of apertures being configured to provide an alternate flow path into the resonator.

* * * * *